United States Patent
Seidel

[15] 3,637,288
[45] Jan. 25, 1972

[54] SINGLE ACOUSTIC FREQUENCY OPTICAL DEFLECTOR

[72] Inventor: Harold Seidel, Warren, N.J.
[73] Assignee: Bell Telephone Laboratories Incorporated, Berkeley Heights, N.J.
[22] Filed: Feb. 5, 1970
[21] Appl. No.: 8,951

[52] U.S. Cl. ............................................. 350/149, 350/161
[51] Int. Cl. ........................................................ G02f 1/24
[58] Field of Search ..................... 350/149, 161, 162, 150

[56] References Cited

UNITED STATES PATENTS

| | | | |
|---|---|---|---|
| 3,421,003 | 1/1969 | Pratt | 350/149 X |
| 3,432,221 | 3/1969 | Harris et al. | 350/149 |
| 3,492,596 | 1/1970 | Vorie | 350/149 X |
| 3,495,912 | 2/1970 | Hooper et al. | 350/149 UX |
| 3,485,559 | 12/1969 | De Maria | 350/161 X |

OTHER PUBLICATIONS

Gordon, " A Review of Acoustooptical Deflection and Modulation Devices," Applied Optics Vol. 5, No. 10 (Oct., 1966) pp. 1629– 1639

S. Harris et al., " Acousto–Optic Tunable Filter" J. Opt. Soc. Am. Vol. 59, No. 6 (June, 1969) pp. 744– 747

Primary Examiner—David Schonberg
Assistant Examiner—Paul R. Miller
Attorney—R. J. Guenther and Arthur J. Torsiglieri

[57] ABSTRACT

An optical beam deflector is described in which a portion of the incident beam is deflected through a variable angle whose magnitude is determined by the direction of propagation of a substantially constant frequency acoustic beam.

8 Claims, 4 Drawing Figures

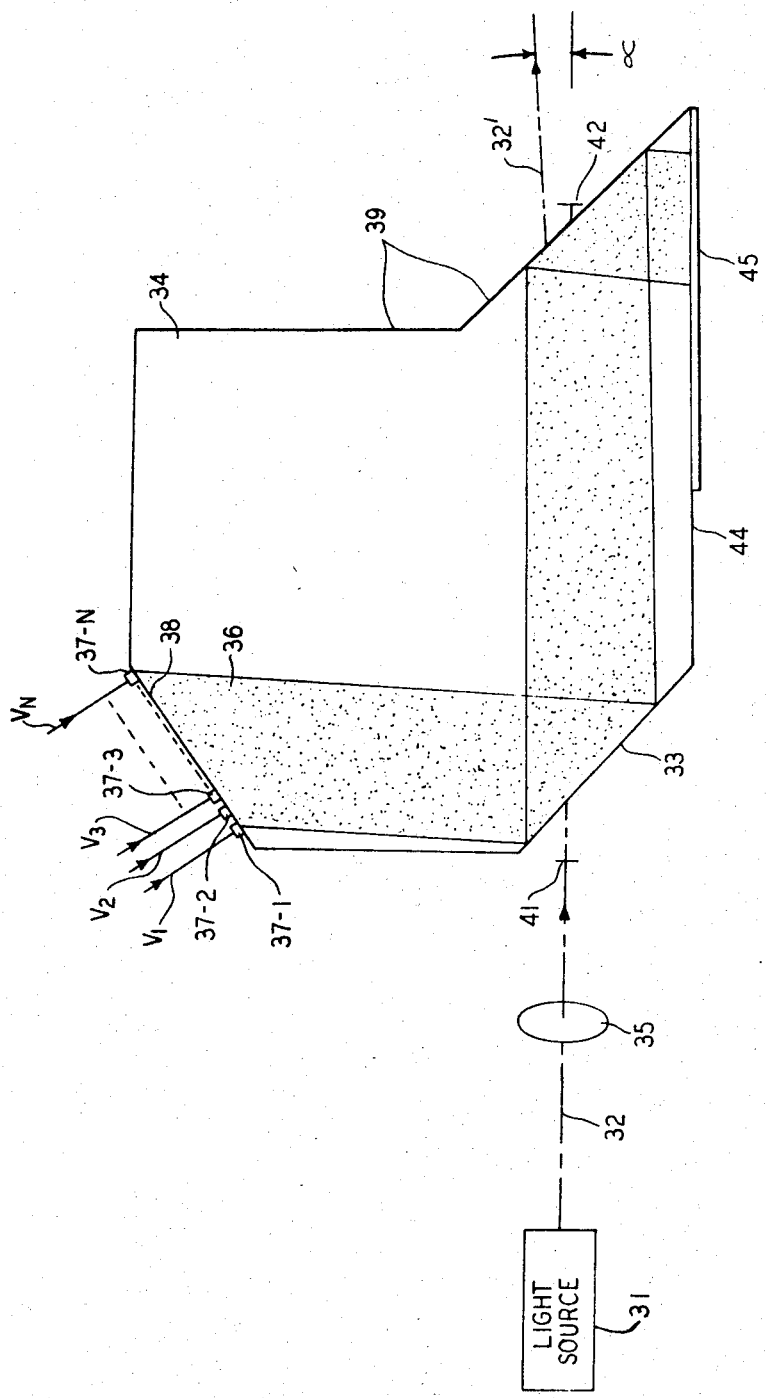

SINGLE ACOUSTIC FREQUENCY OPTICAL DEFLECTOR

BACKGROUND OF THE INVENTION

This invention relates to optical devices and, more particularly, to devices for deflecting optical beams.

As is well known, the employment of optical systems for the communication of information is finding widespread use in modern technology. Computer systems, display systems, and signal processing systems, to mention a few, have made use of optical techniques to increase their efficiency and information handling capabilities. In many systems of these types, devices capable of deflecting optical beams are required. As a result, development of suitable optical deflecting devices has become an area of major importance and concern.

Some of the more promising devices which have been developed for optical deflection utilize acousto-optical interactions. In these devices commonly known as Bragg deflectors, an acoustic beam is used to deflect an applied optical beam. The optical beam is applied along a direction orthogonal to the direction of propagation of the acoustic beam and is deflected through various angles by varying the frequency of the acoustic beam. Usually, the acoustic frequency must be varied over a broad frequency range in order to obtain any appreciable angular deflection of the optical beam. Presently available transducers, however, tend to have relatively narrow bandwidths and hence, operate inefficiently over the frequency ranges required by such prior art deflectors. Solutions to this problem heretofore have been inefficient and have sought to place the burden on the electrical systems which supply energy to the transducers.

It is, therefore, a broad object of the present invention to deflect optical beams using narrow band acoustic systems.

SUMMARY OF THE INVENTION

In accordance with the principles of this invention, optical deflection is accomplished by varying the propagation direction of a substantially constant frequency, acoustic beam. More particularly, an acoustic beam having a predetermined, substantially constant frequency is propagated within a medium having, simultaneously, birefringent and acousto-optical properties. An optical beam propagating in a predetermined direction in space is then applied to the medium. Upon interaction of the optical beam with the acoustic beam within the medium, a portion of the optical beam is diffracted, and a new optical beam, which propagates in a different direction than the applied optical beam, is produced. By changing the direction of propagation of the acoustic beam, rather than its frequency, a corresponding change occurs in the direction of propagation of the newly formed diffracted optical beam. Accordingly, by propagating a substantially constant frequency acoustic beam in diverse directions within the medium, diffracted optical beams having different propagation directions are produced.

BRIEF DESCRIPTION OF THE DRAWINGS

A more complete understanding of the present invention may be obtained from the following description, taken in conjunction with the accompanying drawings, in which:

FIG. 4 illustrates a second embodiment of the instant invention.

DETAILED DESCRIPTION

Figure 1:
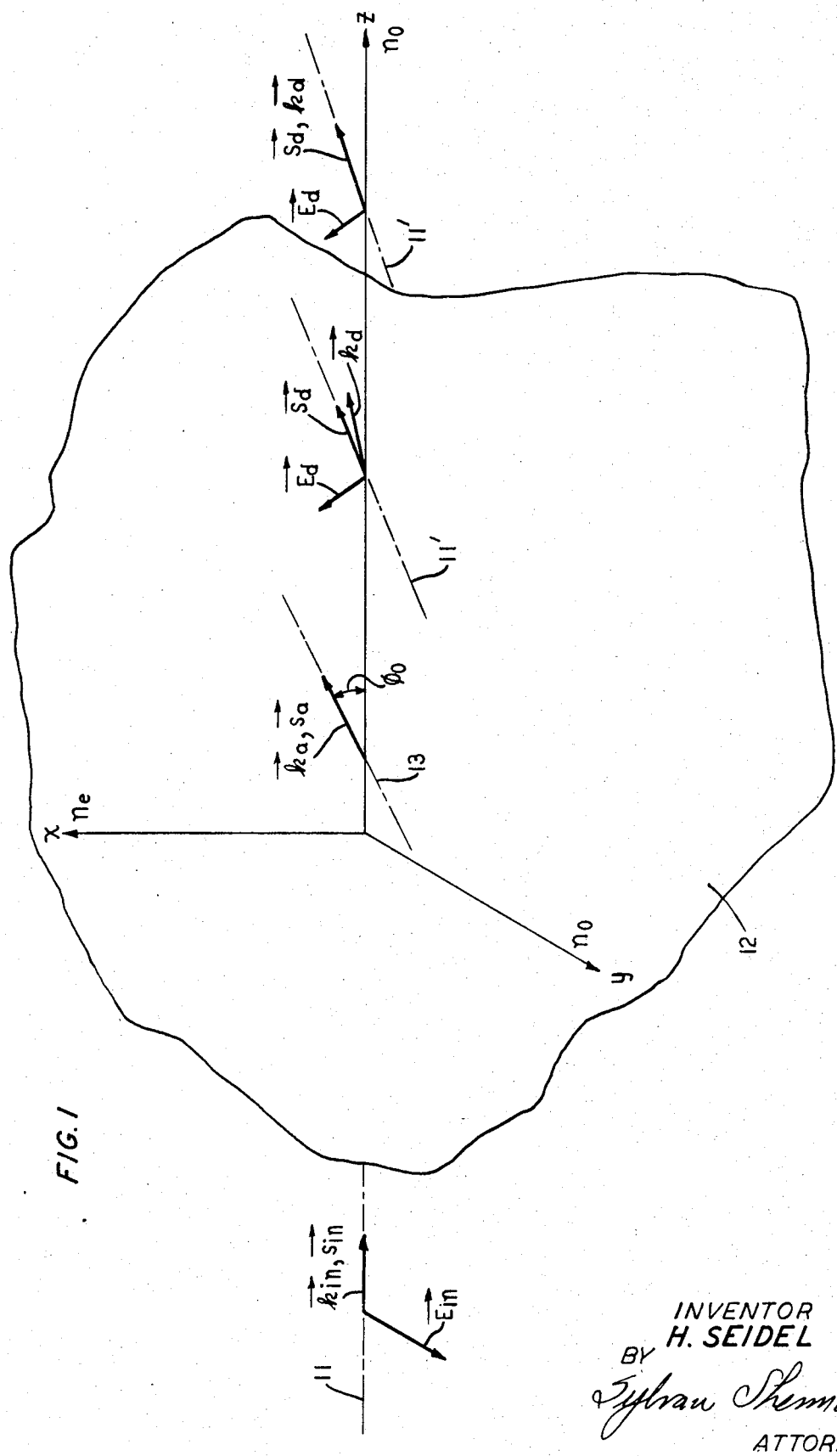
FIG. 1, included for purposes of explanation, illustrates the basic principles of operation of the present invention.

FIG. 1, included for purposes of explanation, illustrates the principles of operation of the present invention. A highly collimated optical beam 11, characterized by a Poynting vector $\vec{s}_{in}$, a wave vector $\vec{k}_{in}$ i.e., a vector perpendicular to the equal phase surfaces of the beam 11 and having a magnitude which is substantially proportional to the optical frequency) and an electric field $\vec{E}_{in}$, is applied to a birefringent, acousto-optical medium 12. For purposes of explanation, it is assumed that optical beam 11, prior to incidence upon medium 12, has been propagating in an isotropic medium and, hence, the vectors $\vec{k}_{in}$ and $\vec{s}_{in}$ are in the same direction. It is further assumed, for the purposes of discussion, that beam 11 is incident normal to the surface of medium 12.

The optical birefringence of medium 12 is indicated by reference to the three mutually perpendicular axes x, y, z, which define the so-called "principle index axes" of the medium. Since the medium is uniaxial along the x-axis, all optical waves propagating therein and having their electric fields polarized perpendicular to the x-axis see the same index of refraction, $n_o$, the so-called "ordinary" index of refraction of the medium. Hence, such waves are generally referred to as ordinary waves. On the other hand, waves having their electric fields polarized parallel to the x-axis see the so-called "extraordinary" index of refraction $n_e$. Waves whose electric fields are polarized oblique to the x-axis, however, see an index of refraction which varies between $n_o$ and $n_e$. Generally, those waves whose electric fields are oblique or parallel to the x-axis are also referred to as extraordinary waves. In the instant illustrative embodiment, it is assumed that medium 12 is a "positive" medium, that is, a medium for which $n_e > n_o$. However, it is noted that "negative" media, media for which $n_e < n_o$, can also be used to practice the invention.

It should be pointed out that the acousto-optical properties of medium 12 are such that strain applied to the medium, as by propagating an acoustic beam therein, causes optical energy to be coupled from one polarization to another. Hence, with the appropriate application of strain to the medium, ordinarily polarized optical energy is coupled to extraordinarily polarized optical energy or vice versa. In general, if transverse acoustic waves are used to induce strain in the medium, all crystals belonging to noncubic classes, such as lithium niobate, will exhibit this coupling effect and can be employed to practice the invention. However, if longitudinal acoustic waves are used, then crystals belonging to the triclinic, monoclinic and trigonal systems, such as copper sulfate pentahydrate, ethylene diamine d-tartrate and quartz, respectively, can be used alternatively, crystals belonging to classes 6 and $-6/m$ of the hexagonal system, such as lithium iodate and zinc oxide, respectively, and classes 4, $\bar{4}$ and $4/m$ of the tetragonal system, such as barium antimonyl tartrate, $Ca_2AL_2SiO_7$, and lead molybdate, respectively, can also be employed.

In the illustrative example, optical beam 11 is applied to medium 12 with its Poynting vector $\vec{s}_{in}$ parallel to the z-axis and its electric field $\vec{E}_{in}$ polarized in the direction of the y-axis. With this given polarization direction, beam 11 propagates along the medium seeing the ordinary index of refraction $n_o$. Furthermore, since beam 11 is incident normal to the medium, it passes into the medium without any change in the direction of its $\vec{s}_{in}$, $\vec{k}_{in}$ and $\vec{E}_{in}$ vectors.

Also propagating in medium 12 is a steerable, substantially constant frequency, highly collimated acoustic beam 13, characterized by an acoustic wave vector $\vec{k}_a$ and a Poynting vector $\vec{s}_a$. Since the magnitude of the vector $\vec{k}_a$ is substantially proportional to the acoustic frequency, it is likewise substantially constant. It should be pointed out that use of the terminology "substantially constant" with respect to the acoustic frequency and the magnitude of a $\vec{k}_a$ is indicative of changes in these parameters of the order of 5 percent or less. Such changes are deemed permissible since they allow the use of conventional, narrow band transducers to generate acoustic beam 13. Typically, such transducers are capable of providing acoustic frequency changes of the order of 5 to 10 percent. Thus, to be well within the limitations of such devices, the acoustic frequency changes contemplated by the instant invention are of the order of 5 percent or less, as indicated above.

Since medium 12 is assumed to be acoustically isotropic, the vectors $k_a$ and $s_a$ are collinear. As illustrated, both vectors are located in the x–z plane and are inclined at an angle $\phi_o$ with respect to the $k_{in}$ vector, which is along the z-axis. Since the beam is steerable, however, the propagation direction of beam 13 will vary over a range $\pm\Delta\phi$. For most applications, the angle $\Delta\phi$ is confined to values of the order of 10° or less. For any particular application, $\Delta\phi$ is a function of the allowable change in the magnitude of $\vec{k_a}$, as will be discussed hereinbelow.

In propagating within medium 12, acoustic beam 13 causes a periodic change in the refractive index of the medium along its direction of propagation. This periodic change in refractive index acts as a moving diffraction grating and, if certain selection rules are met, causes a portion of the incident beam to be deflected, thereby generating an additional optical beam 11' through diffraction interaction. The new beam propagates in a direction that is different than the propagation direction of beam 11, which is along the z-axis. If the direction of propagation of acoustic beam 13 is changed, the index variation occurs along a correspondingly different direction. As a result, the newly generated beam induced by this index variation propagates along a different direction. The effect, therefore, of interacting optical beam 11 with a substantially constant frequency acoustic beam 13 within medium 12, is to generate new optical beams whose directions of propagation vary as a function of the direction of propagation of the acoustic beam.

It should be pointed out that the interaction between optical beam 11 and acoustic 13 not only results in the generation of new beams but results in a shift of the electric field polarization of the newly generated beams relative to the original beam. Hence, while beam 11 is ordinarily polarized, the newly generated beams are extraordinarily polarized. This polarization shift is produced in consequence of the diffraction interaction between the acoustic and optical beams and the strain polarization of the acoustic beam.

In order to obtain a clearer understanding of the above-described interaction of the two beams, an explanation of the process in terms of the wave vectors of the interacting beams will now be presented. This explanation is based upon the following well-known general principles. First, for the diffraction interaction to occur, the new wave vector produced, corresponding to the diffracted optical beam, must constitute an admissible solution of Maxwell's equations which is represented geometrically by showing it to be bound to the wave vector surface of the medium; i.e., a surface which is precisely the locus of all admissible wave vectors satisfying Maxwell's equations. Secondly, the wave vector corresponding to the diffracted optical beam will be substantially the vector sum of the wave vectors corresponding to the two interacting beams.

In view of these principles, a solution is realized for various propagation directions of acoustic beam 13 if, for each of said propagation directions, the vector sum of the wave vectors $\vec{k_{in}}$ and $\vec{k_a}$, corresponding to these two beams, is substantially bound to the wave vector surface of medium 12.

Figure 2:
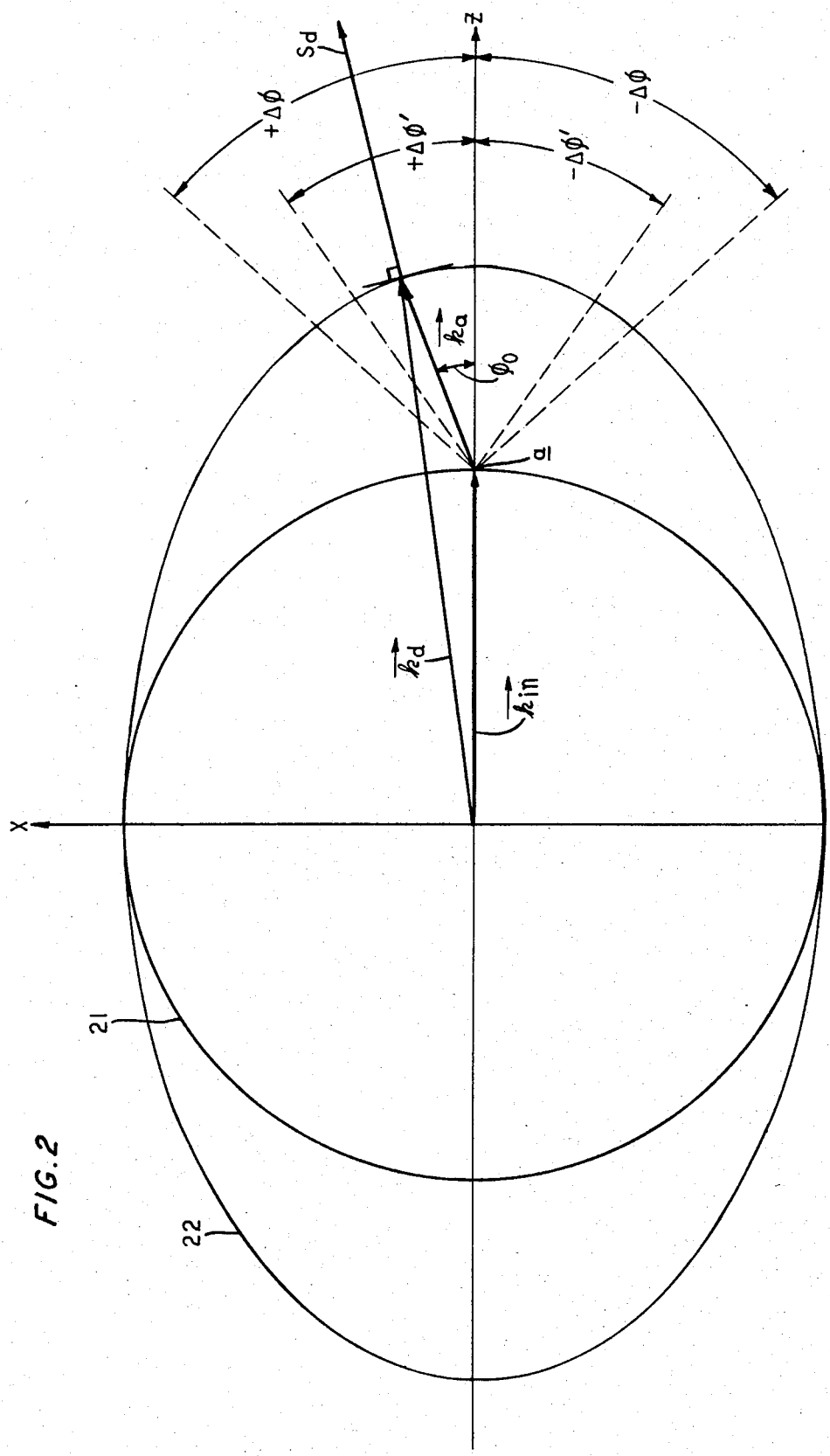
FIG. 2, also included for the purposes of explanation, illustrates the principles of operation of the invention in terms of wave vectors characterizing the acoustic and optical beams of FIG. 1.

As is well known, the wave vector surface of medium 12 is a three-dimensional composite surface comprising a spherical surface inscribed in an ellipsoidal surface. The former surface defines the locus of wave vectors for ordinarily polarized beams propagating in the medium. The latter surface, on the other hand, defines the locus of wave vectors for extraordinarily polarized beams propagating in the medium. FIG. 2 is a two-dimensional representation of the wave surface of medium 12. Specifically, surface 21 depicts the spherical or ordinary component surface and surface 22 the ellipsoidal or extraordinary component surface. The actual three-dimensional wave surface is obtained by rotating surfaces 21 and 22 about the z-axis of FIG. 2, which axis corresponds, in direction, to the z-axis of FIG. 1.

The wave vector $\vec{k_{in}}$ is positioned, in FIG. 2, along the z-direction, as in FIG. 1, and is bound to surface 21, since it corresponds to an ordinarily polarized optical beam. As shown, it is at point $a$ on surface 21. The wave vector $\vec{k_a}$, as also in FIG. 1, is at an angle $\phi_o$ with respect to the z-direction. Its magnitude is chosen such that when drawn from point $a$ on surface 21, the vector $\vec{k_a}$ terminates on surface 22.

The vector $\vec{k_d}$, the sum of $\vec{k_a}$ and $\vec{k_{in}}$, forms a self-consistent new solution of Maxwell's equations bound to extraordinary wave surface 22. Moreover, since the properties of medium 12 enable the appropriate coupling between acoustic strain and optical polarization, the solution implied by this vector sum consistency is actually realized, and a diffracted wave having a wave vector $\vec{k_d}$ is produced.

At this point, it is important to note that in the present description, the wave vector $\vec{k_a}$ has been assumed to be precisely defined. Such an assumption, however, is only true if the wave front to which the vector corresponds is of infinite extent. As the extent of the wave front decreases, the preciseness to which the wave vector $\vec{k_a}$ can be defined similarly decreases, in accordance with the well-known indeterminacy principles of Heisenberg. Hence, while the vectors drawn in FIG. 2 imply that production of a diffracted wave requires precise closure of the diffraction triangle formed by $\vec{k_{in}}$, $\vec{k_a}$ and $\vec{k_d}$ (i.e., that the relationship $\vec{k_d}=\vec{k_{in}}+\vec{k_a}$ must necessarily exist), in actuality some acceptable range of deviation from closure is permissible.

If the direction of the wave vector $\vec{k_a}$ is changed, while its magnitude is kept absolutely constant, it is observed that the vector no longer precisely terminates on surface 22. For such directions, therefore, precise closure of the diffraction triangle is not realized. However, as indicated above, as long as the deviations from closure are within the acceptable range defined by indeterminacy principles, diffracted wave vectors which from new solutions to Maxwell's equations bound to surface 22 are, in fact, produced. Thus, as a practical matter, for directions of constant magnitude vector $\vec{k_a}$ within the angular range $\pm\Delta\phi'$ illustrated in FIG. 2, there is a range of deviations within which closure is obtained, and, hence, for each direction of $\vec{k_a}$ within this range a newly formed diffracted wave vector is produced If a larger range of directions of $\vec{k_a}$ is desired, then the magnitude of $\vec{k_a}$ must necessarily be changed. Since, as mentioned previously, a 5 percent variation in the magnitude of $\vec{k_a}$ is permissible, the range of directions of $\vec{k_a}$ can be further increased to encompass an angular range of $\pm\Delta\phi$, as shown.

It should be noted that, in the aforesaid description, the wave vector $\vec{k_a}$ is symmetrically varied about the wave vector $\vec{k_{in}}$. Although such a variation of $\vec{k_a}$ is not required in theory, it is preferred since the shape of the wave surface about this region allows the angular range $\pm\Delta\phi$ to be maximized with a minimum change in the magnitude of $\vec{k_{in}}$ and, hence, with a minimum change in the acoustic frequency. It should be further noted that the angles $\Delta\phi$ and $\Delta\phi'$, as illustrated in FIG. 2, are greatly exaggerated. As previously indicated, in most applications $\Delta\phi$ is of the order of 10° or less. In practice, therefore, if $\vec{k_a}$ is varied symmetrically about $\vec{k_{in}}$, the two vectors are generally directed along the same direction.

It is clear, from the above wave vector explanation, that for each of the propagation directions of acoustic beam 13 within the angular range $\pm\Delta\phi$, the interaction between acoustic beam 13 and optical beam 12 results in the production of a diffracted optical beam. Each of the diffracted optical beams propagates in a different direction and is of extraordinary polarization. The exact propagation directions of the diffracted beams can be found by determining the directions of their corresponding Poynting vectors. As shown in FIG. 2, this is accomplished by drawing normals to the tangents at the points at which the diffracted wave vectors terminate on surface 22.

Returning now to the discussion of FIG. 1, we observe that propagation of acoustic beam 13 in the particular direction $\phi_o$ has resulted in the production of diffracted optical beam 11'. Beam 11' is characterized by a wave vector $\vec{k}_d$, a Poynting vector $\vec{s}_d$ and an electric field $\vec{E}_d$. In passing from the medium 12 it is refracted in accordance with the well-known laws of refraction. Assuming the refraction effects to be negligible, the beam passes through the surface of medium 12 without alteration of its $\vec{k}_d$ and $\vec{s}_d$ vectors. However, since the beam is now assumed to be propagating in an isotropic medium, its wave vector $\vec{k}_a$ is now collinear with its Poynting vector $\vec{s}_d$.

As previously indicated, as the propagation direction of acoustic beam 13 changes, various diffracted beams similar to beam 11' are produced. Each propagates in different directions and emerges from the surface of medium 12 in a similar manner as beam 11'.

Figure 3:
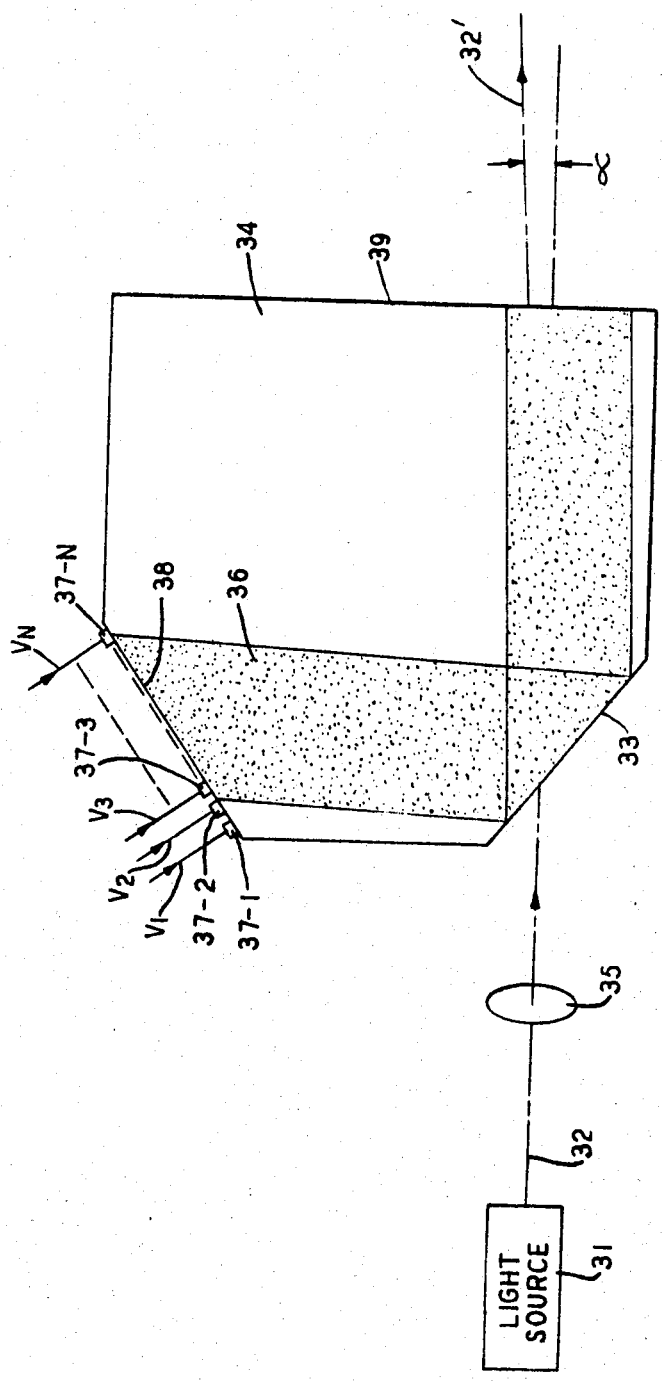
FIG. 3 illustrates a first specific embodiment of the present invention.

In FIG. 3, one form of apparatus for deflecting an optical beam, in accordance with the above-presented principles of operation of the instant invention, is shown. A light beam 32 which is to be deflected is directed by a light source 31 onto a slanted surface 33 of a uniaxial, birefringent, acousto-optical medium 34, such as quartz. Source 31 can be any well-known source capable of providing a highly collimated monochromatic light beam.

Interposed between light source 31 and surface 33 along the propagation direction of beam 32 is a polarizer 35. Polarizer 35 polarizes the electric field of beam 32 in a direction such that beam 35 propagates in medium 34 as an ordinary wave.

Simultaneously propagating in medium 34 is a steerable, substantially constant frequency acoustic beam 36. The acoustic beam is launched by a phased array of N transducers 37-1 to 37-N which are affixed to a surface 38 of the medium. In general, the number and spacing of transducers 37 is determined by the required acoustic beam diffraction angle (i.e., angular width of the acoustic beam when focused). In a typical application, beam 36 may be required to have a diffraction angle of approximately 0.03°. In such cases, typically value of $N=1,000$ and a center-to-center spacing of the transducers equal to the acoustic wavelength can be employed.

The use of transducer phased arrays, such as array 37, to launch steerable acoustic beams is well known in the art (see, for example, E. I. Gordon, "A Review of Acoustooptical Deflection and Modulation Devices," *J. Applied Optics*, Vol. 3, No. 10, pp. 1628–1638, Oct. 1966). Briefly, the operation of such an array is based upon the existence of a preselected phase relationship among the acoustic spherical waves generated by transducers 37. Because of this preselected phase relationship, the waves constructively interfere to form an acoustic beam having a unique propagation direction. Changing the phase relationship in a predetermined manner, however, results in a similar constructive interference of the waves to produce a different propagation direction for the beam. As a result, controlling the phase relationship of the waves enables steering (i.e., changing the propagation direction) of the generated acoustic beam. In the instant embodiment, control of the phase relationship of the acoustic waves is effected by exciting transducers 37-1 to 37-N with phase-modulated signals $V_1$ to $V_N$, respectively, which typically can be generated by any well-known phase modulation technique.

As illustrated, acoustic beam 36 propagates from surface 38 through medium 34 and is intercepted by surface 33. Reflection from surface 33 causes beam 36 to propagate in a path which overlaps the propagation path of optical beam 32. In accordance with the principles of the invention, beam 36 interacts with beam 32 causing a diffracted beam 32' to be produced. Beam 32' emerges from surface 39 of medium 34 at an angle $\alpha$ with respect to the original propagation direction of beam 32. Further, in accord with the invention, as beam 36 changes its propagation direction (i.e., is steered) various diffracted optical beams propagating in different directions are similarly produced and emerge from the medium.

As previously pointed out, in the instant invention, the terminology "substantially constant acoustic frequency" is used to indicate that the acoustic frequency does not change by more than 5 percent. Presently available narrow band transducers can easily accommodate such a change in acoustic frequency. Hence, transducers 37 can be any of the well-known narrow band transducers conventionally employed. Moreover, since operation of the invention is over a narrow frequency, fully efficient use may be made of the transducers.

In FIG. 4, a second embodiment of the instant invention is illustrated. This embodiment is similar, in all respects, to the embodiment of FIG. 1 except for the addition of mirrors 41 and 42, the slanting of a portion of surface 39 of medium 34, and the addition of acoustic absorber 45. As shown, mirrors 41 and 42 are disposed about medium 34 along the path of beam 32. Mirror 41 is partially transparent to the wave energy of beam 32 and allows the beam to be coupled into medium 34. Mirror 42, on the other hand, is totally reflective to such wave energy. Acoustic absorber 45 is affixed to surface 44 of medium 34, as illustrated.

In operation, mirrors 41 and 42 are tuned to resonate the wave energy of beam 32. In so doing, the intensity of beam 32 is enhanced by the Q of the resonant cavity. As a result, the intensity of diffracted beam 32' is similarly enhanced.

It will also be noted that in this embodiment of the invention, acoustic beam 36 is redirected by the slanted portion of surface 39 to surface 44 of medium 34, whereupon the energy of the beam is absorbed by acoustic absorber 45 which, typically, can be lead. Absorption of the acoustic energy in this manner prevents beam 36 from being reflected backward upon itself, and thereby from causing unwanted interactions with optical beam 32.

It is to be understood that the embodiments shown and described herein are merely illustrative and that numerous and varied other arrangements can readily be devised in accordance with the teachings of the present invention by those skilled in the art without departing from the spirit and scope of the invention.

What is claimed is:

1. Apparatus for deflecting an optical beam comprising, in combination:
   a birefringent, acousto-optical medium within which said optical beam propagates;
   and means affixed to said medium for launching within said medium, and in diverse directions relative to the direction of optical beam propagation, an acoustic beam of substantially constant acoustic frequency to change the direction of propagation of a portion of said optical beam.

2. Apparatus according to claim 1 wherein:
   said medium is located within an optical resonator tuned to resonate the wave energy of said optical beam;
   and including means for absorbing the energy of said acoustic beam after it has changed the direction of propagation of a portion of said optical beam.

3. Apparatus according to claim 2 in which said resonator comprises first and second mirrors suitably disposed about said medium along the path of said optical beam.

4. Apparatus according to claim 1 comprising:
   an array of N transducers affixed to a surface of said medium;
   and including means for selectively exciting said transducers.

5. Apparatus according to claim 4 in which said means for selectively exciting said transducers comprises a plurality of N signals having a predetermined phase relationship.

6. Optical deflection apparatus employing a substantially constant frequency acoustic beam comprising, in combination:
   a birefringent, acousto-optical medium;
   a source of optical wave energy;
   means for directing a beam of said optical wave energy onto said medium;
   means for launching an essentially constant frequency acoustic beam within said medium;

characterized in that said optical beam, and said acoustic beam interact within said medium to produce a diffracted optical beam which propagates in a direction different from the direction of propagation of said incident optical beam;

and means for changing the direction of propagation of said acoustic beam relative to the direction of propagation of said optical beam thereby varying the propagation direction of said diffracted optical beam.

7. Apparatus according to claim 6 in which the ordinary index of refraction of said medium is greater than the extraordinary index of refraction of said medium.

8. Apparatus according to claim 6 in which the ordinary index of refraction of said medium is less than the extraordinary index of refraction of said medium.

* * * * *

UNITED STATES PATENT OFFICE
CERTIFICATE OF CORRECTION

Patent No. 3,637,288                    Dated January 25, 1972

Inventor(s) Harold Seidel

It is certified that error appears in the above-identified patent and that said Letters Patent are hereby corrected as shown below:

Column 2, line 51, change "—6/m" to --6/m--.

Column 3, line 8, change "$k_a$" to --$\vec{k}_a$--, change "$s_a$" to --$\vec{s}_a$--;

line 10, change "$k_{in}$" to --$\vec{k}_{in}$--.

Column 4, line 39, change "from" to --form--;

line 53, after "$\vec{k}_a$" remove the "$f$".

Signed and sealed this 8th day of August 1972.

(SEAL)
Attest:

EDWARD M. FLETCHER, JR.           ROBERT GOTTSCHALK
Attesting Officer                 Commissioner of Patents